(12) United States Patent
Lee et al.

(10) Patent No.: US 7,985,506 B2
(45) Date of Patent: Jul. 26, 2011

(54) FUEL CELL SYSTEM AND REFORMER

(75) Inventors: Sung-Chul Lee, Suwon-si (KR);
Ju-Yong Kim, Suwon-si (KR);
Woo-Cheol Shin, Suwon-si (KR);
Yong-Kul Lee, Suwon-si (KR);
Sang-Jun Kong, Suwon-si (KR);
In-Hyuk Son, Suwon-si (KR); Jin-Goo Ahn, Suwon-si (KR); Tae-Keun Kim, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 142 days.

(21) Appl. No.: 12/266,451

(22) Filed: Nov. 6, 2008

(65) Prior Publication Data

US 2009/0169932 A1  Jul. 2, 2009

(30) Foreign Application Priority Data

Dec. 27, 2007 (KR) .................. 10-2007-0139023

(51) Int. Cl.
*H01M 8/18* (2006.01)
(52) U.S. Cl. ........................................ 429/412; 429/413
(58) Field of Classification Search .............. 429/12, 429/13, 20, 22, 412, 413, 425
See application file for complete search history.

(56) References Cited

U.S. PATENT DOCUMENTS

| 5,861,137 | A | 1/1999 | Edlund | |
|---|---|---|---|---|
| 2002/0098394 | A1* | 7/2002 | Keefer et al. | ................... 429/13 |
| 2005/0271907 | A1 | 12/2005 | Kim et al. | |
| 2005/0287053 | A1* | 12/2005 | Sakai et al. | ................... 422/196 |
| 2006/0051262 | A1 | 3/2006 | Park et al. | |

FOREIGN PATENT DOCUMENTS

| CN | 1941483 | 4/2007 |
|---|---|---|
| CN | 1960047 A | 5/2007 |

(Continued)

OTHER PUBLICATIONS

Chinese Office Action for related Chinese Patent Application No. 200810190669.6; dated Jul. 5, 2010.

(Continued)

*Primary Examiner* — Jennifer Michener
*Assistant Examiner* — Monique Wills
(74) *Attorney, Agent, or Firm* — Knobbe, Martens, Olson & Bear LLP (57) ABSTRACT

A fuel cell system and a reformer for a fuel cell system prevents backfire and improves efficiency of heat transfer. The fuel cell system includes a reformer generating hydrogen gas from fuel including hydrogen by a catalytic chemical reaction using heat energy, and at least one electricity generating unit generating electrical energy by an electrochemical reaction between the hydrogen gas and oxygen. The reformer includes a case, a heat source, and a reforming reaction part. The case forms an external shape. The heat source is disposed in the case to generate heat energy by an oxidation reaction between fuel and a catalyst, and includes a mesh, an oxidation catalyst layer formed on a surface of the mesh, and at least one fuel injection nozzle supplying the fuel to the oxidation catalyst layer. The reforming reaction part is disposed in the case to generate hydrogen gas from fuel using the heat energy generated from the heat source.

8 Claims, 6 Drawing Sheets

FOREIGN PATENT DOCUMENTS

| | | |
|---|---|---|
| JP | 57-192489 | 11/1982 |
| JP | 03-218902 | 9/1991 |
| JP | 2003-277019 A | 10/2003 |
| JP | 2005-239525 | 9/2005 |
| JP | 2005-350345 A | 12/2005 |
| JP | 2006-008480 | 1/2006 |
| JP | 2006-076879 A | 3/2006 |
| KR | 10-0429602 | 5/2004 |

OTHER PUBLICATIONS

Korean Notice of Allowance for related Korean Patent Application No. 10-2007-0139023; dated Jul. 5, 2010.

Chinese Office Action for related Chinese Patent Application No. 200810190669.6; dated Mar. 2, 2011; Cited References: CN 1941483 A; JP 2005-239525 A; CN1960047A.

* cited by examiner

FUEL CELL SYSTEM AND REFORMER

CROSS-REFERENCE TO RELATED APPLICATION

This application claims priority to and the benefit of Korean Patent Application No. 10-2007-0139023, filed in the Korean Intellectual Property Office on Dec. 27, 2007, the entire content of which is incorporated herein by reference.

BACKGROUND OF THE INVENTION

1. Technical Field

The present disclosure relates to a fuel cell system and a reformer for a fuel cell system. More particularly, the present invention relates to a fuel cell system and a reformer for a fuel cell system having an improved structure for supplying fuel and an oxidation gas.

2. Description of the Related Art

Fuel cells are an electricity generating system that generate electrical energy through a chemical reaction between hydrogen, which may be part of a hydrocarbon group fuel such as methanol, ethanol, and natural gas, and an oxidation gas supplied separately from the hydrogen.

Polymer electrolyte membrane fuel cell (PEMFC) typically exhibit superior output characteristics, lower operating temperatures, and fast starting and response characteristics, compared with other types of fuel cells. The PEMFC has been widely used as a portable power source for vehicles, a distributed power source for houses and public buildings, and a miniature power source for electronic devices.

A PEMFC system typically includes a stack, a reformer, a fuel tank, and a fuel pump. The stack forms a fuel cell main body that generates electrical energy by a reaction between hydrogen and oxygen, and the fuel pump supplies the fuel stored in the fuel tank to the reformer. The reformer generates hydrogen gas by reforming the fuel and supplies the hydrogen gas to the stack.

In the fuel cell system, since the reformer generates hydrogen gas from the fuel by a catalytic chemical reaction, the reformer includes a heat source for generating heat energy and a reforming reaction part for generating the hydrogen gas by a reforming reaction using the heat energy. The heat source generates the heat energy by an oxidation reaction between the fuel and the oxidation gas using an oxidation catalyst.

In a typical reformer, because the fuel and the oxygen are not uniformly distributed over the oxidation catalyst of the heat source, an oxidation reaction may occur locally, rather than over the entire heat source. Thus, temperature differences exist in the heat source by an incomplete oxidation reaction between the fuel and the oxygen. Accordingly, performance and heating efficiency of the entire reformer may be reduced by the temperature differences in the heat source.

In addition, in a typical reformer, backfire may occur at an end of a fuel injection nozzle, thereby causing additional temperature variation in the reformer.

SUMMARY OF THE INVENTION

Some embodiments provide a fuel cell system, and a reformer for the same, having advantages of supplying fuel to an oxidation catalyst uniformly and preventing backfire.

Some embodiments provide a fuel reformer and a fuel cell system comprising the same. The reformer converts a fuel comprising a hydrocarbon or hydrocarbon group, for example, methanol, ethanol, methane, propane, and the like, into hydrogen gas, which is used by the fuel cell. Embodiments of the reformer exhibit reduced backfire and greater temperature uniformity therein. The reformer comprises a case, a heat source, and a reforming reaction part. In some embodiments, the case is generally cylindrical. The heat source comprises a mesh disposed in the case, an oxidation catalyst disposed on the mesh, and at least one fuel injection nozzle. The fuel injection nozzle comprises a tube with a first open end disposed within the case and a second end, through which fuel is supplied, disposed outside of the case. In some embodiments, the fuel injection nozzle is generally parallel with a longitudinal axis of the case. In some embodiments, an inner diameter of the first end of the fuel injection nozzle is smaller than an inner diameter of the second end of the fuel injection nozzle. Some embodiments of the fuel injection nozzle further comprise a plurality of nozzle holes on a surface thereof. At least one reforming tube extends through the case of the reformer. In some embodiments a plurality reforming tubes are generally symmetrically arranged around a central fuel injection nozzle.

An exemplary embodiment provides a reformer for a fuel cell system including a case, a heat source, and a reforming reaction part. The case forms an external shape. The heat source is disposed in the case to generate heat energy by an oxidation reaction between fuel and a catalyst, and includes a mesh, an oxidation catalyst layer formed on a surface of the mesh, and at least one fuel injection nozzle supplying the fuel to the oxidation catalyst layer. The reforming reaction part is disposed in the case to generate hydrogen gas from fuel using the heat energy generated from the heat source.

The at least one fuel injection nozzle may include a tube having a plurality of nozzle holes formed on an external surface of the tube. The at least one fuel injection nozzle may include a first end as an open end, and a filler may be disposed at the first end. The filler may comprise at least one of aluminum beads, quartz beads, and a material having a mesh structure.

The at least one fuel injection nozzle may further include a second end opposite from the first end, and an internal diameter of the first end may be smaller than an internal diameter of the second end. The at least one fuel injection nozzle may further include a variable portion adjacent to the first end and having an internal diameter that gradually decreases toward the first end.

The reforming reaction part may further include at least one reforming tube penetrating the case and allowing a flow of the fuel therethrough.

The at least one fuel injection nozzle may be disposed at a center portion of the case, and the at least one reforming tube may be arranged around the fuel injection nozzle. Selectively, the at least one reforming tube may be disposed at a center portion of the case, and the at least one fuel injection nozzle may include a plurality of fuel injection nozzles arranged around the reforming tube.

Another embodiment provides a fuel cell system including a reformer generating hydrogen gas from fuel including hydrogen by a catalytic chemical reaction using heat energy, and at least one electricity generating unit generating electrical energy by an electrochemical reaction between the hydrogen gas and oxygen. The reformer includes a case, a heat source, and a reforming reaction part. The case forms an external shape. The heat source is disposed in the case to generate heat energy by an oxidation reaction between fuel and a catalyst, and includes a mesh, an oxidation catalyst layer formed on a surface of the mesh, and at least one fuel injection nozzle supplying the fuel to the oxidation catalyst layer. The reforming reaction part is disposed in the case to generate hydrogen gas from fuel using the heat energy generated from the heat source.

According to an exemplary embodiment, a catalyst portion includes the mesh and the oxidation catalyst layer formed on the mesh, and thus the fuel can be uniformly supplied to the oxidation catalyst layer. Accordingly, a temperature distribution can be uniform in the entire reformer. Therefore, performance and heat efficiency of the reformer can be improved.

In addition, the fuel injection nozzle includes a portion in which an internal diameter gradually decreases toward the first end, and a filler disposed in the first end of the open end. Thus, backfire of the fuel injection nozzle can be reduced or prevented.

Further, according to the exemplary embodiment, the heat source and the reforming reaction part are disposed in the same space. Thus, the size of the reformer can be reduced, and heat efficiency can be improved. Accordingly, the performance of the reformer can be enhanced.

Some embodiments provide reformer for a fuel cell system and a fuel cell system comprising the same, the reformer comprising: a case; a heat source disposed in the case, the heat source comprising a mesh, an oxidation catalyst layer disposed on a surface of the mesh, and at least one fuel injection nozzle configured for supplying a fuel to the oxidation catalyst layer to generate heat energy by an oxidation reaction between the fuel and an oxidant; and a reforming reaction part disposed in the case, configured to generate hydrogen gas from the fuel using heat energy generated by the heat source.

In some embodiments, the at least one fuel injection nozzle comprises a tube comprising a plurality of nozzle holes disposed on an external surface of the tube. In some embodiments, the at least one fuel injection nozzle comprises an open first end, and a filler disposed at the first end. In some embodiments, the filler comprises at least one of aluminum beads, quartz beads, and a mesh.

In some embodiments, the at least one fuel injection nozzle further comprises a second end opposite the first end, and an internal diameter of the first end is smaller than an internal diameter of the second end. In some embodiments, the at least one fuel injection nozzle further comprises a variable portion adjacent to the first end with an internal diameter that gradually decreases toward the first end.

In some embodiments, the reforming reaction part further comprises at least one reforming tube penetrating through the case and configured for fuel flow therethrough.

In some embodiments, the at least one fuel injection nozzle is disposed at a center portion of the case, and the at least one reforming tube is arranged around the fuel injection nozzle.

In some embodiments, the at least one reforming tube is disposed at a center portion of the case, and the at least one fuel injection nozzle comprises a plurality of fuel injection nozzles arranged around the reforming tube.

In some embodiments, the fuel cell system further comprises: at least one electricity generating unit configured for generating electrical energy by an electrochemical reaction between the hydrogen gas and oxygen.

DETAILED DESCRIPTION OF CERTAIN EMBODIMENTS

Hereinafter, certain embodiments will be described more fully hereinafter with reference to the accompanying drawings, in which exemplary embodiments are shown. As those skilled in the art would realize, the described embodiments may be modified in various different ways, all without departing from the spirit or scope of the present disclosure.

Figure 1:
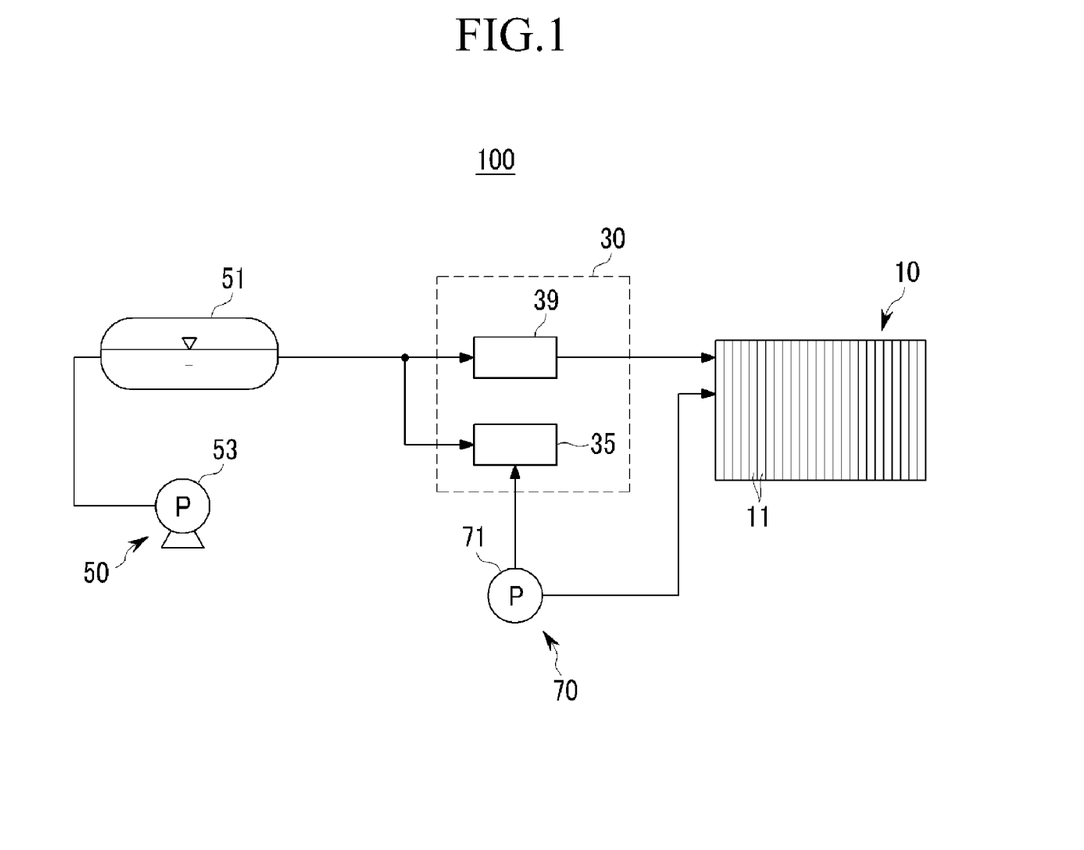
FIG. 1 is a schematic block diagram of a fuel cell system according to an exemplary embodiment.

FIG. 1 is a schematic block diagram of a fuel cell system 100 according to an exemplary embodiment.

Referring to FIG. 1, a fuel cell system 100 employs a polymer electrolyte membrane fuel cell (PEMFC). Thus, in the fuel cell system 100, hydrogen is generated by reforming a fuel, and electrical energy is generated by electrochemically reacting the hydrogen with oxygen.

The fuel cell system 100 may use a liquid or gas fuel comprising hydrogen, such as methanol, ethanol, and natural gas. Hereinafter, the fuel cell system 100 using a liquid fuel such as methanol will be described as an example.

In the fuel cell system 100, oxygen gas stored in a separate tank or unprocessed air including oxygen may be used as the source of oxygen that reacts with the hydrogen. An exemplary embodiment using unprocessed air will be described.

The fuel cell system 100 according to the present exemplary embodiment includes an electricity generating unit 11 generating electrical energy by a reaction between oxygen and hydrogen, a reformer 30 generating hydrogen from fuel by an catalytic reaction using heat energy to supply the hydrogen to the electricity generating unit 11, a fuel supply 50 supplying the fuel to the reformer 30, and an air supply 70 supplying air to the electricity generating unit 11 and the reformer 30.

Figure 2:
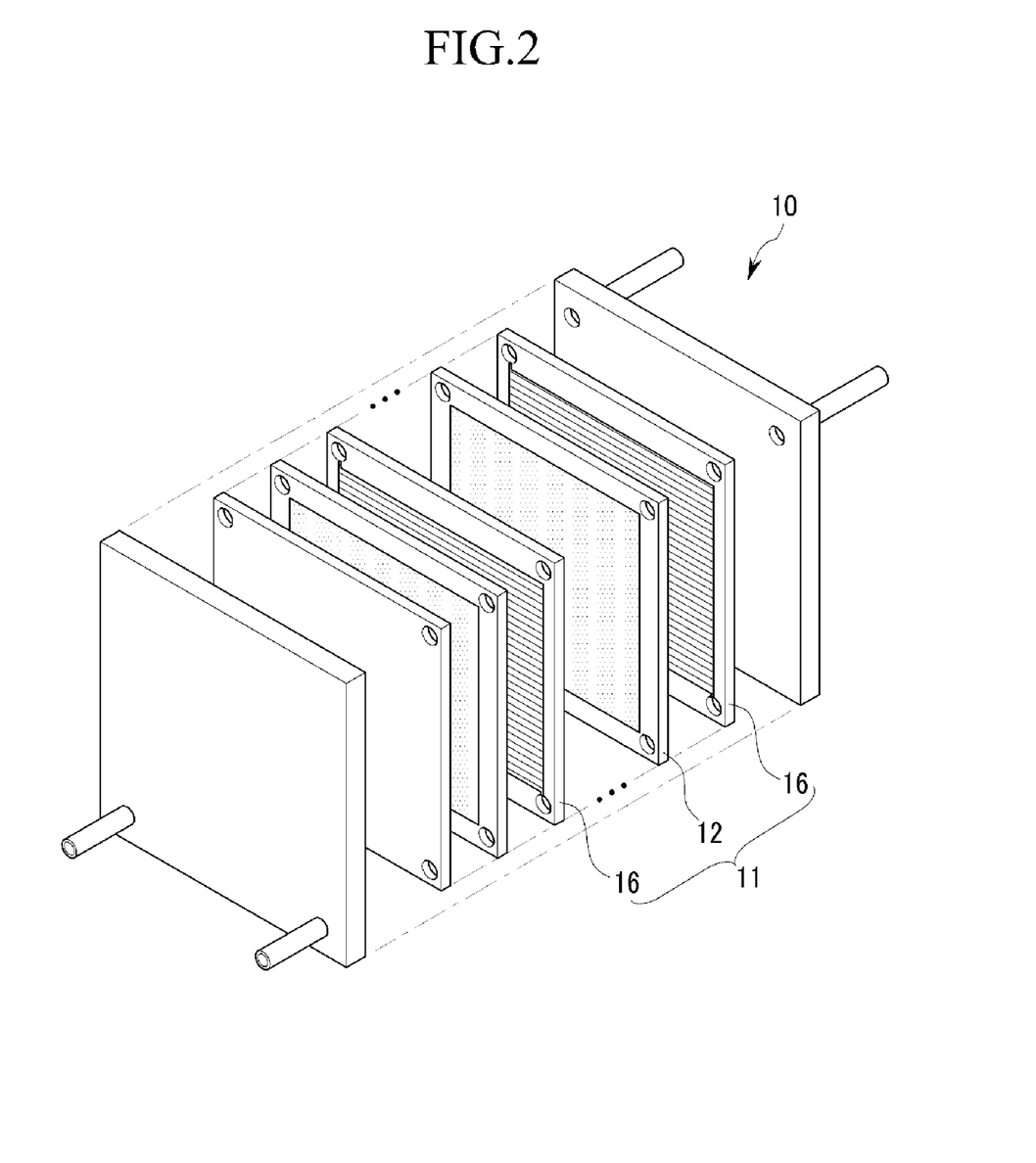
FIG. 2 is an exploded perspective view of a stack shown in FIG. 1.

As shown in FIG. 2, the electricity generating unit 11 includes at least one unit cell, which is a minimum unit for performing an electrochemical reaction between the hydrogen and the oxygen. Each unit cell includes a membrane-electrode assembly (MEA) 12, and separators (or bipolar plates) 16 disposed on each side of the MEA 12.

A plurality of the electricity generating units 11 is consecutively stacked to form a stack 10. The stack 10 may be a typical stack used in a polymer electrolyte membrane fuel cell (PEMFC). Thus, a detailed description of the structure of the stack 10 will be omitted.

According to the present exemplary embodiment illustrated in FIG. 1, the reformer 30 generates hydrogen by a chemical reaction, for example, a stream reforming reaction, a partial oxidation reforming reaction, or an autothermal reforming reaction. The reformer 30 includes a heat source 35 generating heat energy, and a reforming reaction part 39 generating hydrogen by a reforming reaction of the fuel using the heat energy. The heat source 35 and the reforming reaction part 39 will be described below in more detail with reference to FIGS. 3 and 4.

The fuel supply 50 supplying the fuel to the reformer 30 includes a fuel tank 51 for storing the fuel, and a fuel pump 53 for discharging the fuel from the fuel tank 51 to supply the fuel to the reformer 30. The fuel tank 51 can be fluidly connected to the heat source 35 and the reforming reaction part 39.

The air supply 70 provides air at a predetermined pressure, and includes an air pump 71 supplying the air to the electricity generating unit 11 and to the heat source 35. In the present exemplary embodiment, the air supply 70 supplies the air to the electricity generating unit 11 and the heat source 35 with one air pump 71, as shown in drawings, but is not limited thereto. Thus, the air supply may include a pair of air pumps, each supplying air to one of the electrical generator and the heat source, respectively. In addition, in some embodiments, the air supply 70 does not comprise an air pump 71. For example, in some embodiments, the air supply 71 may include a fan.

Hereinafter, the reformer 30 according to the present exemplary embodiment will be described more fully with reference to the accompanying drawings.

Figure 3:
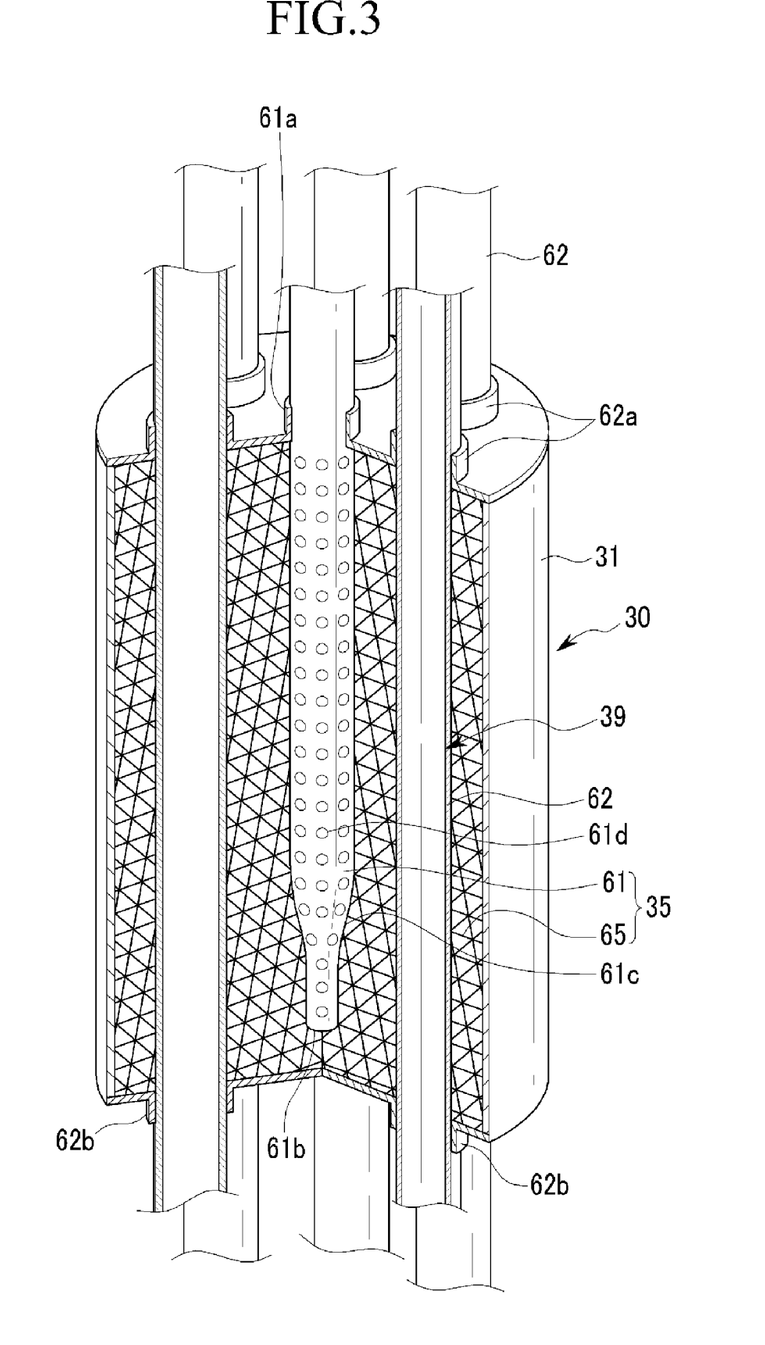
FIG. 3 is a sectional perspective view of a reformer for a fuel cell system according to a first exemplary embodiment.
Figure 4:
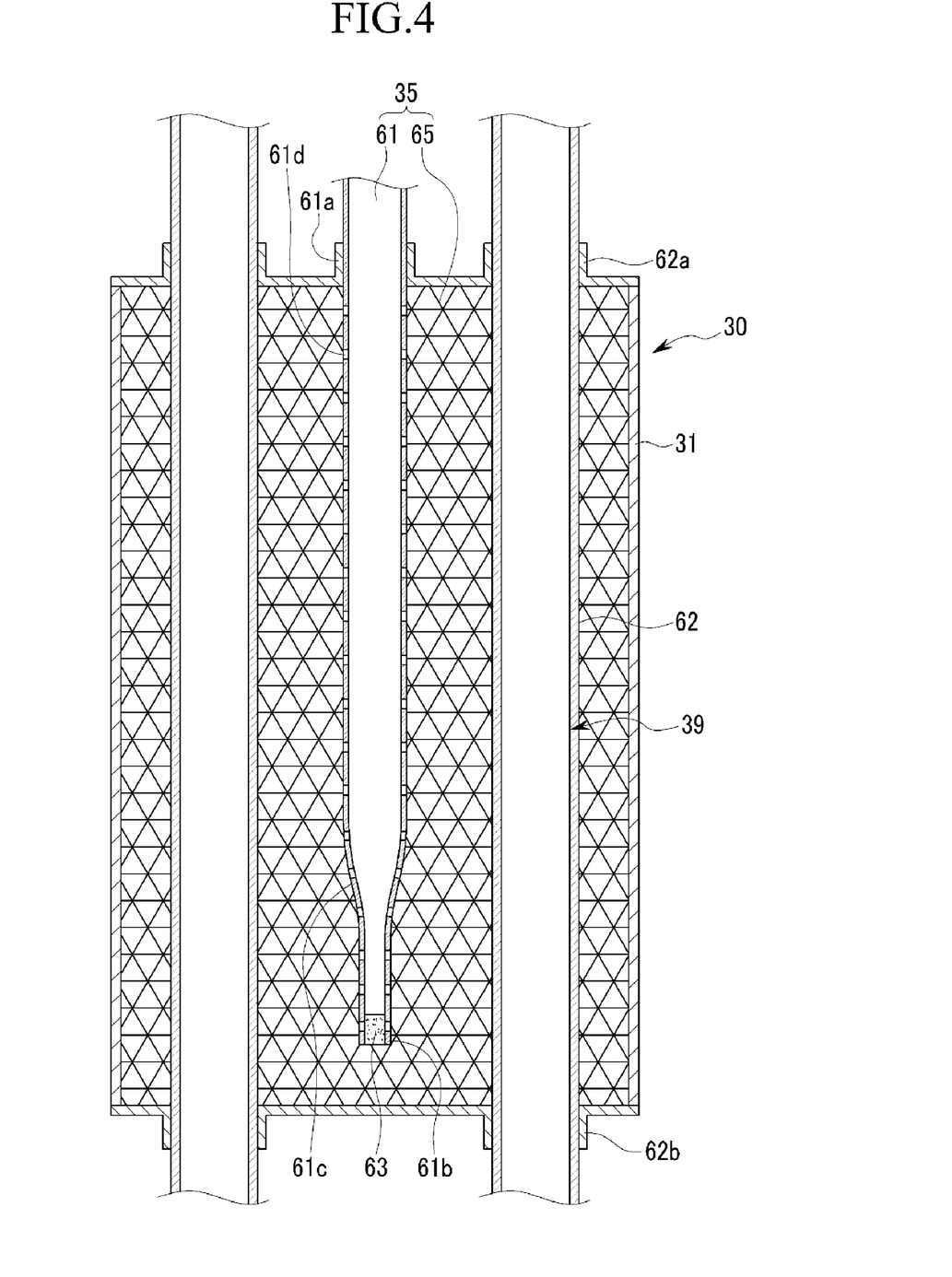
FIG. 4 is a schematic longitudinal cross-sectional view of FIG. 3.

FIG. 3 is a sectional perspective view of a reformer 30 for a fuel cell system according to a first exemplary embodiment, and FIG. 4 is a longitudinal cross-sectional view of the reformer illustrated in FIG. 3.

Referring to FIGS. 3 and 4, the reformer 30 of the present exemplary embodiment includes a case 31 defining an external shape of the reformer 30, the heat source 35, and a reforming reaction part 39. The heat source 35 generates heat energy by a catalytic oxidation reaction, and the reforming reaction part 39 generates hydrogen from a fuel by a catalytic reforming reaction using the heat energy.

The reforming reaction part 39 includes at least one reforming tube 62 penetrating through the case 31 and allowing a flow of the fuel therethrough.

The case 31 has a generally cylindrical shape. A first end of the case 31 comprises a plurality of first holes 62a and a second hole 61a. The reforming tubes 62 are inserted into the first holes 62a, and a fuel injection nozzle 61, which will be described later, is inserted into the second hole 61a. In addition, a second end of the case 31 comprises a plurality of third holes 62b, which are aligned with the first holes 62a. The reforming tubes 62 also pass through the third holes 62b.

The ends of a reforming tubes proximal to the first holes 62a may be fluidly connected to the fuel tank 51, and the ends of a reforming tubes proximal to the third hole 62b may be fluidly connected to the electricity generating unit 11 of the stack 10.

Figure 6:
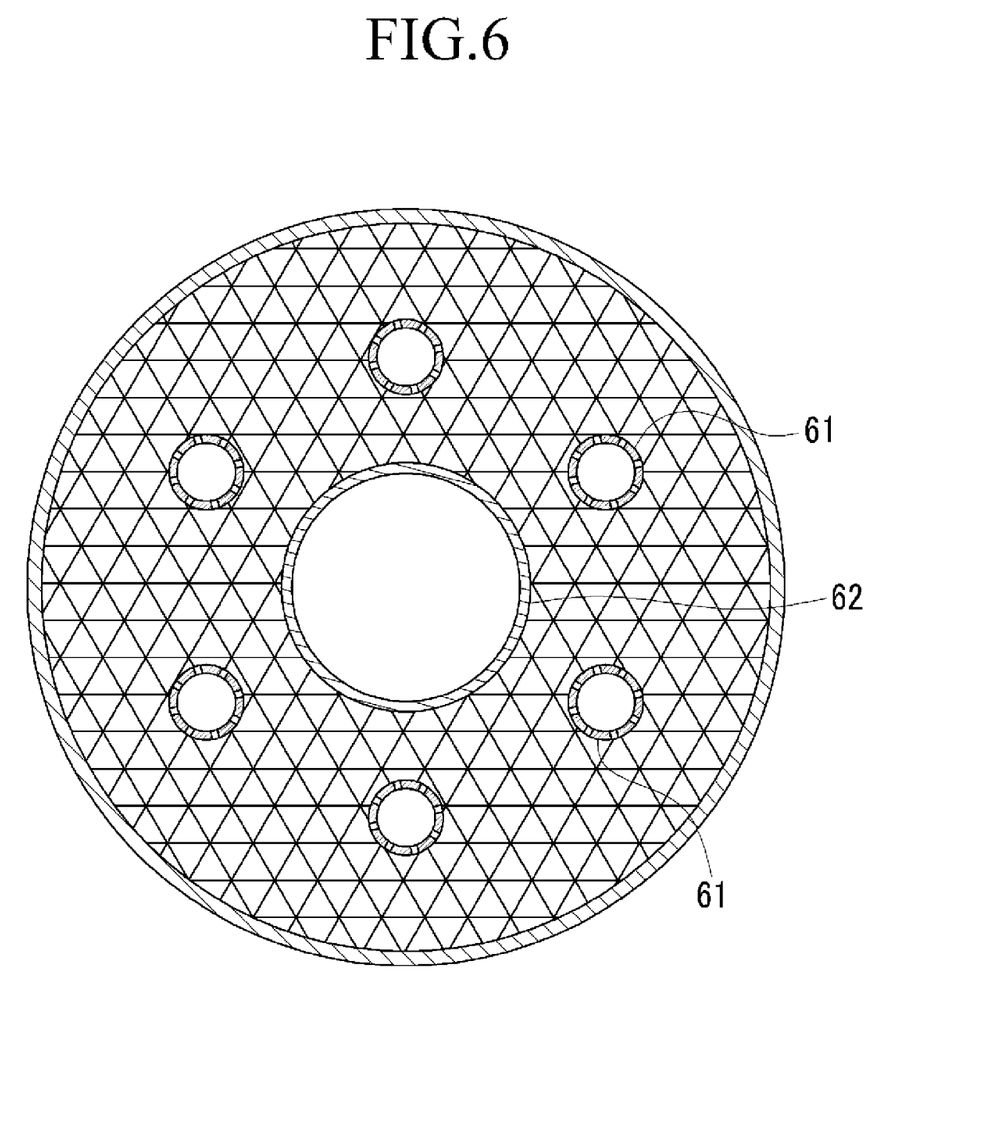
FIG. 6 is a transverse cross-sectional view of a reformer for a fuel cell system according to a second exemplary embodiment.

The fuel injection nozzle 61 is disposed generally at the center of the reformer 30, and a plurality of reforming tubes 61 are arranged around the fuel injection nozzle 61 at substantially uniform intervals. However, the illustrated structure is exemplary and the structure of the reformer 30 is not limited thereto. Thus, as shown in FIG. 6, a reforming tube 62 can also be disposed generally at the center of the reformer 30 and a plurality of fuel injection nozzles 61 can be arranged around the reforming tube 62.

Figure 5:
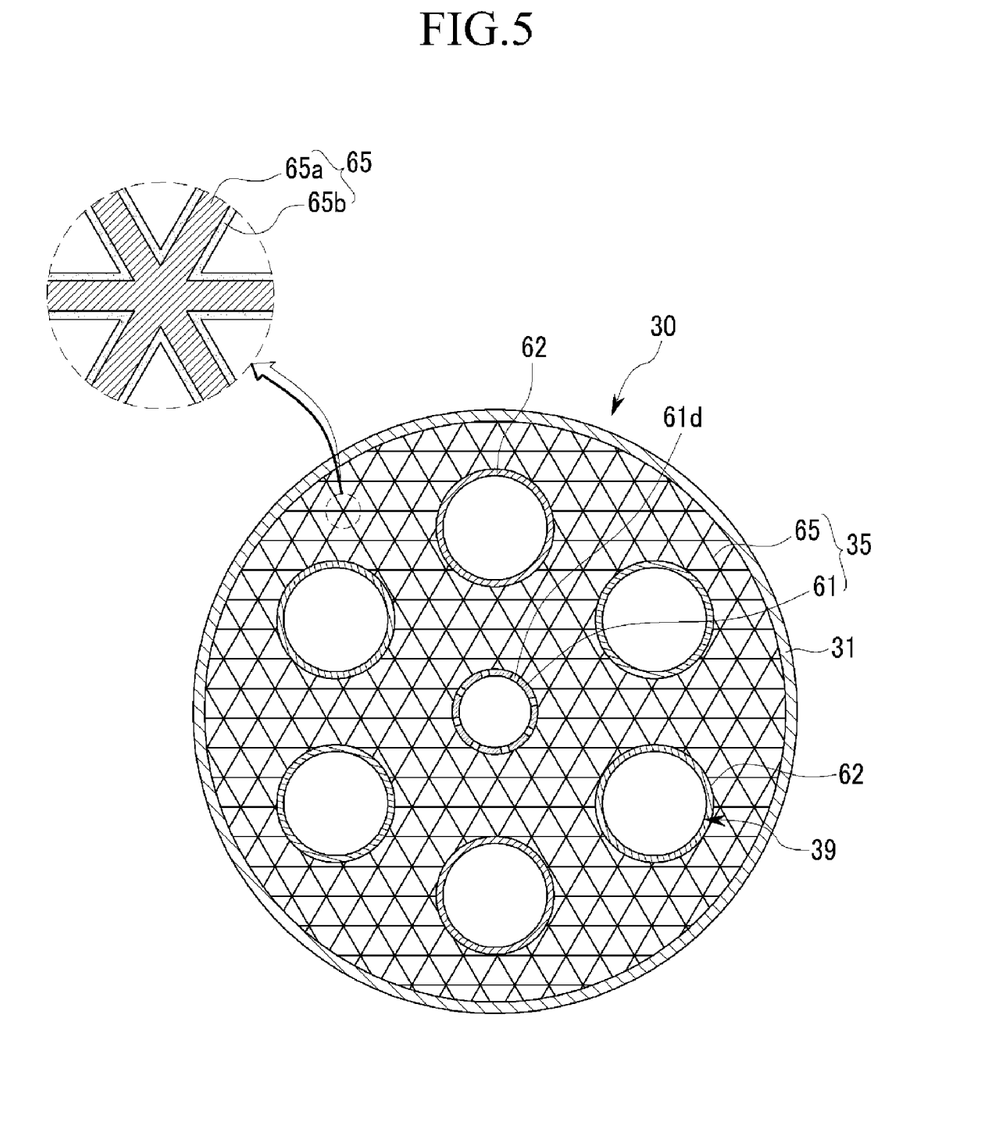
FIG. 5 is a transverse cross-sectional view of FIG. 3.

Referring to FIGS. 3, 4, and 5, the heat source 35 includes the fuel injection nozzle 61 configured for injecting fuel into the inside of the reformer 30, and a catalyst portion 65 disposed within the reformer 30. The fuel injection nozzle 61 comprises an open tube. A second end of the fuel injection nozzle 61 is fluidly connected to the fuel pump 53, and a first end is open. A variable portion 61c adjacent to the open end 61b of the fuel injection nozzle 61 has an internal diameter that decreases gradually from the second end to the open first end 61b. Accordingly, an internal diameter of the open end 61b is smaller than an internal diameter of the portion of the fuel injection nozzle 61 into which the fuel flows. Decreasing the internal diameter of the open end 61b prevents and/or reduces backfire in which a flame flows backward.

As best seen in FIG. 4, a filler 63 may be disposed at the open end 61b of the injection nozzle. The filler 63 comprises at least one of aluminum beads, quartz beads, and a material having a mesh structure. The filler 63 prevents the flame from flowing backward, as well as spraying the fuel discharged from the open end 61b. Accordingly, the backfire can be effectively reduced and/or prevented.

As illustrated in FIGS. 3 and 5, a plurality of nozzle holes 61d is disposed around a circumference of the fuel injection nozzle 61. The fuel is injected into the inside of the reformer 30 through the nozzle holes 61d. The nozzle holes 61d are substantially uniformly disposed on a surface of the fuel injection nozzle 61. Therefore, the fuel can be injected into the catalyst portion 65 disposed inside the reformer 30.

As shown in FIG. 5, the catalyst portion 65 includes a mesh 65a, comprising a plurality of wires crossing each other to form a net structure, and an oxidation catalyst layer 65b disposed on a surface of the mesh 65a.

The mesh 65a comprises a three-dimensional net structure, in which the crossed wires form lattices.

Hereinafter, an operation of the fuel cell system 100 according to the exemplary embodiment will be described in more detail.

In the operation of the fuel cell system 100, the fuel stored in the fuel tank 51 is supplied to the fuel injection nozzle 61 of the reformer 30 by the fuel pump 53. Simultaneously, air is supplied to the fuel injection nozzle 61 by the air pump 71. The fuel and the air may be simultaneously supplied to the fuel injection nozzle 61 by simultaneously operating the fuel pump 53 and air pump 71. In some embodiments, the fuel and the air may be sequentially supplied to the fuel injection nozzle 61 by sequentially operating the fuel pump 53 and air pump 71.

The fuel and the air are injected into the inside of the case 31 of the reformer 30 through the nozzle holes 61d of the fuel injection nozzle 61. Thus, the fuel and the air can be uniformly distributed over the catalyst portion 65 therein. The fuel and the air contact the oxidation catalyst layer 65b, thereby initiating an oxidation reaction.

In the heat source 35, an oxidation catalyst catalyzes a combustion reaction between the fuel and the air. Accordingly, the heat energy generated thereby provides a predetermined temperature suitable for the reforming reaction in the reforming reaction part 39. Since the fuel and the air can be uniformly supplied to the oxidation catalyst layer 65b through the nozzle holes 61d of the fuel injection nozzle 61, the oxidation reaction between the fuel and the air can be uniformly induced in the heat source 35. Particularly, the catalyst portion includes the mesh and the oxidation catalyst layer formed on the surface of the mesh, and thus the fuel can be uniformly supplied to the oxidation catalyst layer.

Thus, in the present exemplary embodiment, hot spots in the heat source 35, areas in which the temperature is substantially higher than a temperature of the remaining portion of the heat source, are reduced or eliminated. Accordingly, temperature differences in the heat source 35 can be reduced, thereby supplying heat energy with a uniform temperature distribution to the reforming reaction part 39.

In this state, the fuel stored in the fuel tank 51 is supplied to the reforming tube 62 by operating the fuel pump 53. Then, the reforming reaction part 39 absorbs the heat energy generated by the heat source 35, and generates hydrogen by a fuel reforming reaction of the fuel using the heat energy.

Next, the hydrogen is supplied to the electricity generating unit 11 of the stack 10 through the reforming tube 62. Simultaneously, air is supplied to the electricity generating unit 11 by the air pump 71. Then, the electrical generator 11 outputs a predetermined amount of electrical energy by an electrochemical reaction between oxygen in the air and the hydrogen.

While certain embodiments have been described in connection with what is presently considered to be practical exemplary embodiments, it is to be understood that the disclosure is not limited thereto, but, on the contrary, is intended to cover various modifications and equivalent arrangements included within the spirit and scope of the appended claims.

What is claimed is:

1. A reformer for a fuel cell system, comprising:
a case;
a heat source disposed in the case; and
a reforming reaction part disposed in the case,
wherein the heat source comprises a mesh, an oxidation catalyst layer disposed on a surface of the mesh and a fuel injection nozzle configured to supply fuel to the oxidation catalyst layer to generate heat energy by an oxidation reaction between the fuel and an oxidant,
wherein the fuel injection nozzle comprises a tube,
wherein the tube comprises a plurality of nozzle holes penetrating a lengthwise surface of the tube within the interior of the case,
wherein the fuel injection nozzle comprises a first open end and a filler disposed at the first open end, and
wherein the reforming reaction part is configured to generate hydrogen gas from the fuel using heat energy generated by the heat source.

2. The reformer of claim 1, wherein the filler comprises at least one of aluminum beads, quartz beads and a mesh.

3. The reformer of claim 1, wherein the fuel injection nozzle further comprises a second end opposite the first end, and wherein an internal diameter of the first end is smaller than an internal diameter of the second end.

4. The reformer of claim 1, wherein the fuel injection nozzle further comprises a variable portion adjacent to the first end with an internal diameter that gradually decreases toward the first end.

5. A fuel cell system, comprising:
the reformer of claim 1;
a fuel cell stack in fluid communication with the reformer; and
an electricity generating unit disposed in the fuel cell stack, wherein the electricity generating unit is configured to generate electrical energy by an electrochemical reaction between the hydrogen gas and oxygen.

6. The fuel cell system of claim 5, wherein the filler comprises at least one of aluminum beads, quartz beads and a mesh.

7. The fuel cell system of claim 5, wherein the fuel injection nozzle further comprises a second end opposite the first end, and wherein an internal diameter of the first end is smaller than an internal diameter of the second end.

8. The fuel cell system of claim 5, wherein the fuel injection nozzle further comprises a variable portion adjacent to the first end with an internal diameter that gradually decreases toward the first end.

* * * * *